Feb. 13, 1968     G. A. KEMENY ETAL     3,369,069
PNEUMATIC DETECTION OF WEAR AND FAILURE OF AN ELECTRODE TIP
Filed March 2, 1967
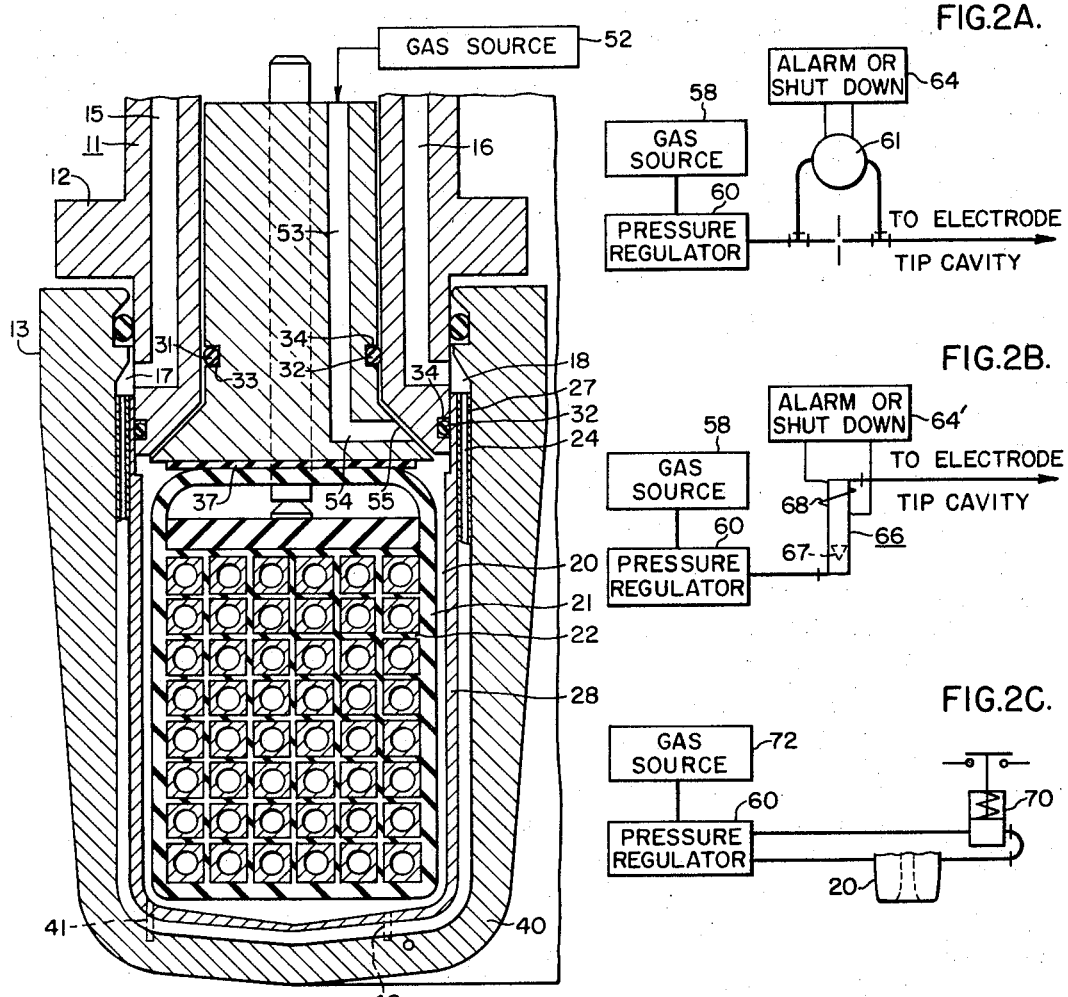
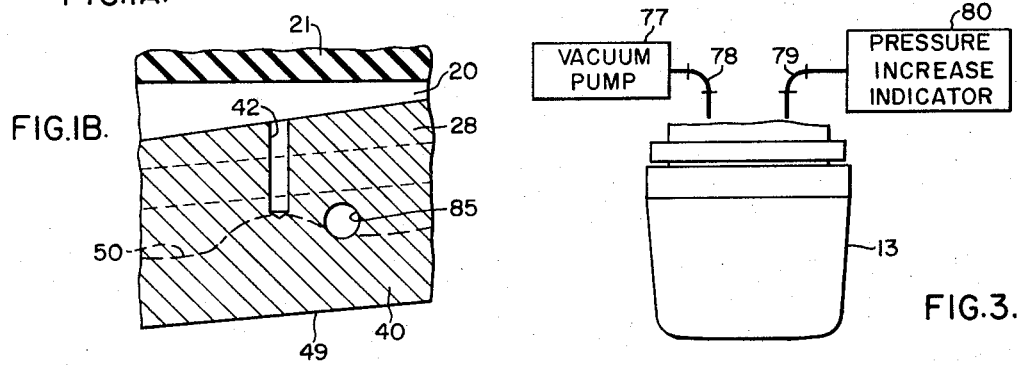
WITNESSES
Theodore F. Wrobel
James F. Young
INVENTORS
George A. Kemeny
and Ronald R. Akers
BY Maury I. Hull
ATTORNEY United States Patent Office 3,369,069
Patented Feb. 13, 1968

3,369,069
PNEUMATIC DETECTION OF WEAR AND
FAILURE OF AN ELECTRODE TIP
George A. Kemeny, Export, and Ronald R. Akers, Pittsburgh, Pa., assignors to Westinghouse Electric Corporation, Pittsburgh, Pa., a corporation of Pennsylvania
Filed Mar. 2, 1967, Ser. No. 620,072
16 Claims. (Cl. 13—18)

ABSTRACT OF THE DISCLOSURE

In an electrode having an electrode tip with a fluid cavity in the electrode tip with fluid flowing through conduits in the tip to conduct heat flux from the tip, means is provided to make the cavity pressure-tight and the cavity is then pressurized to at least a few pounds per square inch. A plurality of bores are made in the bottom of the cavity at spaced intervals around the periphery of the electrode, the bores not extending entirely through the means forming the arcing surface but extending a sufficient depth in accordance with the estimated permissible wear of the electrode so that when the material forming the arcing surface is consumed to the point where any bore has the lower or other end thereof forming a complete path to the outside of the tip, gas in the cavity will escape and the pressure in the cavity will be reduced. Several devices are disclosed for indicating when the pressure in the cavity has dropped. One of these is a pressure regulator feeding gas to the cavity through a flow indicating device. In normal operation, there is no flow indication. For higher flows such as would occur after burn-through of the tip metal, the flow detecting means senses increased gas flow and actuates suitable circuitry for giving an alarm and/or initiating shut-down. Another means of detecting when the gas flow increases as a result of one of the bores completing a passage through the tip is to use a flowrator which yields information of how many wear sensing holes are exposed.

Further, a pressure regulator feeds gas at pressure through a suitable tube to the electrode tip cavity. A pressure switch senses cavity pressure through a second suitable passage similar to the inlet passageway to the cavity. Pressure loss in the cavity causes the pressure switch to actuate circuitry for shutting down the arc. We also indicate tip wear or tip failure by partially evacuating the air in the cavity and connecting the cavity to a pressure increase indicator, wear or burnthrough resulting in a pressure increase in the cavity which is indicated by the pressure increase indicator.

Background of the invention

The invention relates to an electrode for use in arc furnaces of the type which has an electrode tip with a cavity within the tip and conduits near the arcing surface of the tip for the flow of cooling fluid to conduct heat flux from the tip. Our invention relates to means for detecting when burnthrough of the tip has occurred and for detecting when wear has reached a permissible limit.

Description of the prior art

In view of the intensely hot arc spot, when the arc stops rotating failure can be assumed within a few seconds unless the current to the arc is cut off. Our invention has the advantages of simplicity and reliability over many prior art schemes.

Summary

In an electrode having an electrode tip with a hollow cavity therein and forming an arcing surface, the tip having fluid flow passageways therein near the arcing surface for conducting a cooling fluid past the surface and conducting heat flux therefrom, we provide means for making the cavity inside the electrode tip pressure tight. We drill holes only partially through the arcing surface forming means of the electrode at the bottom of the electrode tip or cavity, the holes extending to a position which is considered the permissible limit of wear of the electrode tip. When the electrode tip is worn to this limit, one or more of the holes or bores becomes a passageway from the cavity completely through the electrode tip with a resulting change in pressure in the cavity. This change in pressure in the cavity is sensed and used to initiate an alarm or to shut down the current to the arc. We may pressurize the cavity or conversely, we evacuate at least partially the interior cavity and have means connected thereto for indicating a pressure increase which results when one of the bores in the bottom of the tip is opened to form a passageway as a result of sufficient wear of the tip.

Brief description of the drawings

FIGS. 1A and 1B show an electrode tip pneumatic wear and failure detection means according to the preferred embodiment of our invention;

FIGS. 2A, 2B and 2C show three different arrangements for detecting a decrease in pressure or a loss of gas from the cavity;

FIG. 3 shows a second embodiment of our invention in which the cavity is partially evacuated and an indication of a pressure increase therein is utilized to provide an indication of the fact that wear has occurred on the arcing surface of the electrode tip to such an extent that one of the bores from the cavity has been opened to form a passageway completely through the electrode tip. If a major tip failure has occurred, the resultant hole will cause a rapid pressure increase and the pressure increase indicator can initiate arc shut down.

Description of the preferred embodiments

In FIG. 1A an electrode is shown generally designated 11 having a supporting structure 12 and an electrode tip 13. It will be understood that the view in FIG. 1A shows a cross-section which reveals only one-half of the electrode. The electrode tip 13 is annular in shape and generally U-shaped in cross-section, but since the electrode tip is of uniform construction around the entire periphery thereof and of uniform construction within, the other half of the cross-section is omitted for simplicity of illustration. A supporting structure 11 is seen to include fluid flow passageways 15 and 16 communicating with fluid headers 17 and 18. There is a cavity 20 within the electrode tip formed between the housing 21 of the field coil 22 and the adjacent inner metallic wall of the tip. The metallic portion of the tip may include inner and outer annular shells 28 and 40 respectively, both U-shaped in cross section, having therebetween a plurality of peripherally spaced conduits 27 with fluid passageways 24 therethrough. The aforementioned passageways 24 for the flow of cooling fluid near the arcing surface extend at spaced intervals around the entire periphery of the electrode tip and are generally U-shaped, communicating at the ends thereof with headers 17 and 18.

As aforementioned, in one embodiment means are provided for pressurizing the cavity 20 between the field coil housing and the inside surface of shell 28, this cavity extending around the entire tip. To this end, O-rings 31 and 32 seated in annular grooves 33 and 34 respectively may be provided. Furthermore, a gasket 37 extending around the entire electrode tip between the field coil housing and the supporting structure may additionally assist in making the cavity 20 pressure tight.

As previously stated, a number of bores are provided extending from the cavity 20 through the inner shell 28, through the spaces between peripherally spaced conduits, and partially through the outer shell 40 but not extending to the outside arcing surface of outer shell 40. Two of these bores are shown at 41 and 42. It will be understood that any number of similar bores may be provided extending at spaced intervals, or at random intervals, around the entire periphery of the electrode tip, including the sides.

Particular reference is made now to FIG. 1B, showing an enlarged fragmentary portion of the electrode tip of FIG. 1A. In FIG. 1B the dashed line 50 indicates the point or position to which wear is assumed to have taken place on the arcing surface, the original position of which is shown at 49. It is seen that when wear has taken place to the dashed line 50 that the bore 42 which originally extended only a partway through the outer shell 40 now constitutes a complete passageway from cavity 20 to the outside of the electrode. Gas escapes from the cavity 20 and the resultant falling pressure therein is sensed by apparatus hereinafter to be described.

Initially, cavity 20 may be pressured by connecting a gas source 52 by way of passageways 53 and 54 in the supporting structure, and by way of space 55, as shown, to the cavity 20.

Particular reference is made now to FIG. 2A which represents an arrangement of apparatus for indicating when the pressure in cavity 20 drops as a result of failure. A pressure regulator 60 feeds gas from source 58 through a flow detecting device 61 to the electrode tip cavity 20; for normal flow produced for example by minor leakage of gas the flow detecting device is set not to be actuated. For higher flows such as would occur after burnthrough of the tip metal resulting in forming a passageway from the cavity to the outside of the electrode tip, the flow detecting device 61 senses increased gas flow and actuates suitable circuitry to set off an alarm or initiate shutdown. This circuitry is symbolized by the apparatus shown in block form at 64.

Particular reference is made now to FIG. 2B. Pressure regulator 60 feeds gas from source 58 under pressure to the electrode tip cavity if desired by way of passageways 53 and 55 through a flowrator generally designated 66 having a float 67 and a magnetic field coil 68. If there is a major flow increase such as would result from a burnthrough in the electrode tip or the opening of a large number of the bores therein to form a passageway to the outside of the electrode tip, the flowrator float 67 is forced to the top of the tube where a pickup coil 68 is energized or suitable switch closed which causes actuation of the shutdown procedure or gives an alarm. The alarm or shutdown device is shown at 64'.

Particular reference is made now to FIG. 2C. The pressure regulator 60 feeds gas from source 72 by a suitable tube into the electrode tip cavity. A pressure switch 70 senses cavity pressure through a second suitable passage similar to the passages 54 and 53 of FIG. 1A. Pressure lost causes the pressure switch to actuate circuitry to shut down the arc.

Particular reference is made now to FIG. 3, which shows another embodiment of our invention; a vacuum pump 77 is connected by conduit means 78 to cavity 20 in the electrode tip 13, the cavity 20 not being shown for convenience of illustration. Other conduit means 79 connects the cavity 20 to a pressure increase indicator 80. Should a burnthrough of the electrode tip occur, or should wear of the surface of the electrode tip occur, to the line 50 of FIG. 1B, then the bore 42 would form a passageway extending from the cavity to the outside of the electrode and there would be an increase in pressure in the electrode tip indicated by the pressure increase indicator 80.

Bores in the outer shell 40 of the electrode tip may extend circumferentially in the tip and communicate with the cavity 20, one such bore being shown at 85, FIG. 1B.

In the electrode tip shown at 13, it is to be understood that conduits 27 with their fluid flow passageways 24 are spaced around the entire periphery of the electrode, and it is clearly to be understood that bores provided for sensing wear or failure, such as bores shown at 41 and 42, do not pass through the conduits 27 under any circumstances but are disposed between conduits. It is the practice to fill up the space between conduits with a brazing compound which is readily borable. By way of further summary, the electrode tip structure has been arranged to form a substantially closed cavity between the field coil housing and the wall of the inner shell of the electrode tip, and pneumatic means have been provided to pressurize this cavity. Loss of pressure in the cavity, or flow into the cavity, are detected to yield information on tip wear and/or initiate shutdown for significant pressure or gas loss indicating a burnthrough, or indicating that one or more of the aforementioned bores is providing a passageway to the outside of the electrode tip. Also, the cavity may be partially evacuated, and an increase in pressure therein resulting from the formation of a passageway to the outside of the tip, such as by opening bore 42, sensed and used to indicate failure.

By way of further summary, one advantage of our invention is that by quickly detecting burnthrough, arcing can be stopped before field coil damage takes place. Also our invention can be used in detecting wear so that an electrode can be replaced before it burns through. This is particularly desirable if the electrode is removed before any water passages have been exposed as this may allow the replacing at the worn away metal by electroplating or other means.

By way of further summary it should be understood that degree of electrode tip wear can be determined from the amount of gas leakage. The more bores extend to the outside of the cavity, the more wear has taken place and the more urgent it becomes to replace the electrode tip. Thus the more leakage, the more serious the wear.

The term "wear" as employed in the claims includes a burnthrough of the electrode tip as a result of the intensely hot arc spot remaining too long in one position.

If the tip burns through, pressurized gas will flow out of the hole, and this outflow of gas will tend to protect the field coil during the shutdown procedure.

The term "utilization means" as employed in the claims includes a device for giving an alarm or opening the circuit which supplies the current which produces the arc, or both.

The drawings and the foregoing written description are illustrative and exemplary only and are not to be interpreted in a limiting sense.

We claim as our invention:
1. In electrode apparatus of the type having a tip forming an arcing surface and having a cavity extending at least partially around the electrode tip, the improvement which includes at least one bore extending from the cavity part of the way through the tip toward the arcing surface, means connected to the cavity for establishing a pressure therein other than atmospheric pressure, wear of the electrode tip surface to a condition where the bore is opened forming a through passageway from the cavity to the outside of the electrode tip resulting in a change of pressure within the cavity.

2. Apparatus according to claim 1 including means for sensing the change in pressure.

3. In electrode apparatus of the type having an annular hollow tip forming an electrode arcing surface and having a field coil and a field coil housing disposed in the hollow space of the electrode, with spaces between the field coil housing and the adjacent walls of the electrode tip forming a cavity, the cavity including a space between the bottom of the coil housing and the inside wall of the bottom portion of the tip, the electrode including a supporting structure supporting the tip and the field coil, the improvement which includes the electrode structure also having at least one passageway for providing that there is gas under a pressure different from atmospheric pressure in said cavity and further including means for making the cavity pressure tight, the electrode tip having at least one bore extending from the cavity part of the way through the tip toward the arcing surface, wear of the electrode tip surface to a point where the bore is opened forming a through passageway from the cavity to the outside of the electrode tip resulting in a change of pressure within the cavity.

4. Apparatus according to claim 3 including in addition a source of gas under pressure, means including a flow sensing device connecting the source to the cavity, alarm and shutdown means connected to the flow sensing device, the flow sensing device being constructed and arranged to supply a signal to the alarm and shutdown means after the pressure or flow has reached a predetermined value and begins to change substantially from said value, the flow rate changing when the bore in the electrode tip forms a passageway from the cavity to the outside of the electrode tip.

5. Electrode apparatus according to claim 3 including a source of gas under pressure and a pressure regulator connected thereto, and conduit means and a flowrator connecting the pressure regulator to the cavity in the electrode tip, the flowrator indicating an increased rate of flow when the bore in the electrode tip is opened forming a passageway from the cavity to the outside of the electrode tip, the flowrator including means for generating a signal as a result of the increased flow, and utilization means connected to the flowrator for utilizing the signal.

6. Electrode apparatus according to claim 1 additionally characterized as including a plurality of other bores similar to said bore at spaced intervals around the electrode tip.

7. Electrode apparatus according to claim 3 including a source of gas under pressure, a pressure regulator connected to the source to receive gas therefrom, a differential pressure switch having one direct connection with the pressure regulator, the pressure switch being further connected to the cavity in the electrode tip, the pressure switch effecting no switching operation as long as the pressures received by the two paths are substantially the same, the pressure in the last-named path falling when the electrode tip has been worn to a position whereat the bore in the electrode tip forms a passageway from the cavity to the outside of the electrode tip.

8. An electrode according to claim 3 including in addition gasket means for effecting a pressure seal between the coil housing and the supporting structure of the electrode.

9. An electrode according to claim 3 including in addition a plurality of O-rings disposed in a plurality of annular grooves for effecting pressure tight sealing at the cavity.

10. Electrode apparatus according to claim 3 additionally characterized as having a plurality of other bores in addition to said bore, at least some of the other bores extending longitudinally of the arcing surface of the electrode tip and communicating with said cavity.

11. Electrode apparatus according to claim 3 in which the electrode tip is additionally characterized as being annular in shape and substantially U-shaped in cross-section, and including in addition a plurality of U-shaped conduits therein at spaced intervals around the entire periphery of the tip, the conduits conducting cooling fluid near the arcing surface, the tip having a plurality of bores extending from the cavity toward the arcing surface, said bores partially through the electrode tip being placed at positions where they do not pass through any of said conduits.

12. Apparatus for use with an electrode having an electrode tip according to claim 1 further characterized in that the electrode has a body portion supporting the tip, the tip being annular in shape, the tip being hollow and having a field coil in a housing disposed therein, there being a cavity extending around the entire electrode and formed between the walls of the field coil housing, the bottom of the field coil housing and the adjacent surfaces of the electrode tip, vacuum means operatively connected to said cavity for at least partially evacuating the same, and a pressure increase indicator operatively connected to said cavity for indicating increase in pressure therein, at least the bottom of the electrode tip having a plurality of bores therein extending from the cavity part of the way to the arcing surface, wear of the tip to an extent where one of the bores forms an open passageway from the cavity to the outside of the electrode tip resulting in a pressure increase in said cavity, said pressure increase being indicated on the pressure increase indicator.

13. Apparatus according to claim 12 in which the electrode is additionally characterized as including means especially designed to make said cavity pressure tight.

14. Appaartus according to claim 12 including in addition bores extending longitudinally of the electrode tip and communicating with said cavity.

15. An electrode apparatus of the type having a tip forming an arcing surface and having an enclosed cavity extending at least partially around the electrode tip, the wall portion of the tip between the arcing surface and the cavity having at least one surface depression on the cavity side thereof, includes means connected to the cavity for establishing a pressure therein other than atmospheric pressure, loss of material from the arcing surface of the tip creating a passageway through said depression from the cavity to the outside of the tip resulting in a change in pressure in the cavity, and means for sensing said change in pressure.

16. Apparatus according to claim 12 in which the electrode tip is additionally characterized as having U-shaped conduits at spaced intervals around the periphery thereof and the bores communicating with the cavity do not pass through said conduits.

References Cited
UNITED STATES PATENTS

| | | | |
|---|---|---|---|
| 2,973,452 | 2/1961 | Garmy | 314—69 |
| 2,984,876 | 5/1961 | Garmy | 22—57 |
| 3,130,292 | 4/1964 | Gage et al. | 219—75 |
| 3,132,235 | 5/1964 | Anderson | 219—75 |

BERNARD A. GILHEANY, *Primary Examiner.*

H. B. GILSON, *Assistant Examiner.*